US007249777B2

(12) United States Patent
Schreiber

(10) Patent No.: US 7,249,777 B2
(45) Date of Patent: Jul. 31, 2007

(54) CAMBER TUBE LEVEL

(75) Inventor: Philip H. Schreiber, Denver, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 9 days.

(21) Appl. No.: 11/218,450

(22) Filed: Sep. 2, 2005

(65) Prior Publication Data

US 2006/0049608 A1 Mar. 9, 2006

Related U.S. Application Data

(60) Provisional application No. 60/608,311, filed on Sep. 9, 2004.

(51) Int. Cl.
*A61G 5/00* (2006.01)
*B62M 1/14* (2006.01)

(52) U.S. Cl. .............................. 280/250.1; 280/304.1; 180/907

(58) Field of Classification Search ............. 280/250.1, 280/304.1, 86.751, 86.752, 86.753, 86.754, 280/86.755, 86.756, 86.757; 180/907
See application file for complete search history.

(56) References Cited

U.S. PATENT DOCUMENTS

| | | | | |
|---|---|---|---|---|
| 1,730,109 | A * | 10/1929 | Bacon | 33/377 |
| 2,384,453 | A * | 9/1945 | Chaney et al. | 33/365 |
| 4,852,899 | A * | 8/1989 | Kueschall | 280/250.1 |
| 6,311,999 | B1 * | 11/2001 | Kueschall | 280/250.1 |

* cited by examiner

*Primary Examiner*—Lesley D. Morris
*Assistant Examiner*—Marc A. Scharich
(74) *Attorney, Agent, or Firm*—MacMillan, Sobanski & Todd, LLC

(57) ABSTRACT

A level on a wheelchair allows the cambered rear wheels to be easily adjusted to eliminate toe-in/toe-out. The level comprises a ball encased in a curved track. The curve track is formed in a clear housing that mounts to the underside of a wheelchair camber tube or wheel axle. The camber tube or wheel axle is rotated until the ball aligns with an indicator mark indicating that toe-in/out has been eliminated from the cambered wheels.

20 Claims, 3 Drawing Sheets

CAMBER TUBE LEVEL

CROSS REFERENCE TO RELATED APPLICATIONS

This application claims the benefit of U.S. Provisional Patent Application No. 60/608,311, filed on Sep. 9, 2004.

BACKGROUND OF INVENTION

This invention relates in general to land vehicles and more particularly, to personal mobility vehicles. Most particularly, the invention relates to wheelchairs having camber tubes for supporting manually driven wheels.

Manual, or non-powered, wheelchairs typically comprise a seating surface, a backrest, and a wheelchair frame that is supported by rear wheels, and front casters. Wheelchairs often incorporate a number of adjustments that allow the wheelchair to be customized to fit a particular user size. Typically, manual wheelchairs provide a height adjustment in the rear wheels and/or the front casters. The rear wheels of the wheelchair may be cambered, or angled, with respect to a vertical plane. A wheelchair with a large camber angle has more responsive turning, which is beneficial in sports applications. A wheelchair with little to no camber angle has a smaller overall width and thus greater maneuverability in tight confines.

When an adjustment is made to the rear wheel height or front caster height on a wheelchair with cambered wheels, the rear wheels will toe-in or toe-out. That is to say, the rear wheels become misaligned with respect to horizontal. This misalignment is undesirable because it increases rolling friction. If the rear wheels are raised or the front casters are lowered, the rear wheels will toe-in. Conversely, if the rear wheels are lowered or the front casters are raised, the rear wheels will toe-out. This occurs because the axis of the camber is no longer aligned horizontally. To correct this misalignment the camber tube must be rotated about its axis in order to re-align the camber angle with respect to horizontal. Typically, a horizontal or vertical reference plane is provided on the camber tube to indicate when the camber angle is aligned horizontally. When a horizontal reference plane is provided, a user would hold a bubble level on this surface and rotate the camber tube until the plane is level. When a vertical reference plane is provided, a user would hold a 90-degree angle between the reference plane and the ground and rotate the camber tube until the plane is vertical. Such an adjustment is difficult because it requires additional tools and several hands to perform the operation. U.S. Pat. No. 4,852,899 discloses the use of a spirit or bubble level that is permanently mounted to the top of a camber tube. This invention facilitates toe-in and toe-out adjustment, wherein the user rotates the camber tube until the bubble level is centered. However, because the bubble level is on top of the camber tube, the seating surface blocks the user's view of the bubble level. This makes the invention awkward to use, particularly when the camber tube is situated very close to the seating surface.

What is needed is a camber tube level indicator that can be viewed easily from the side of the wheelchair or from below.

SUMMARY OF INVENTION

The present invention is directed towards a level that meets the foregoing needs. The level on a wheelchair comprises a ball encased in a curved track. The curve track is formed in a clear housing that mounts to the underside of a wheelchair camber tube or wheel axle. The camber tube or wheel axle is rotated until the ball aligns with an indicator mark indicating that toe-in/out has been eliminated from the cambered wheels.

Various objects and advantages of this invention will become apparent to those skilled in the art from the following detailed description of the preferred embodiment, when read in light of the accompanying drawings.

DETAILED DESCRIPTION

Figure 1:
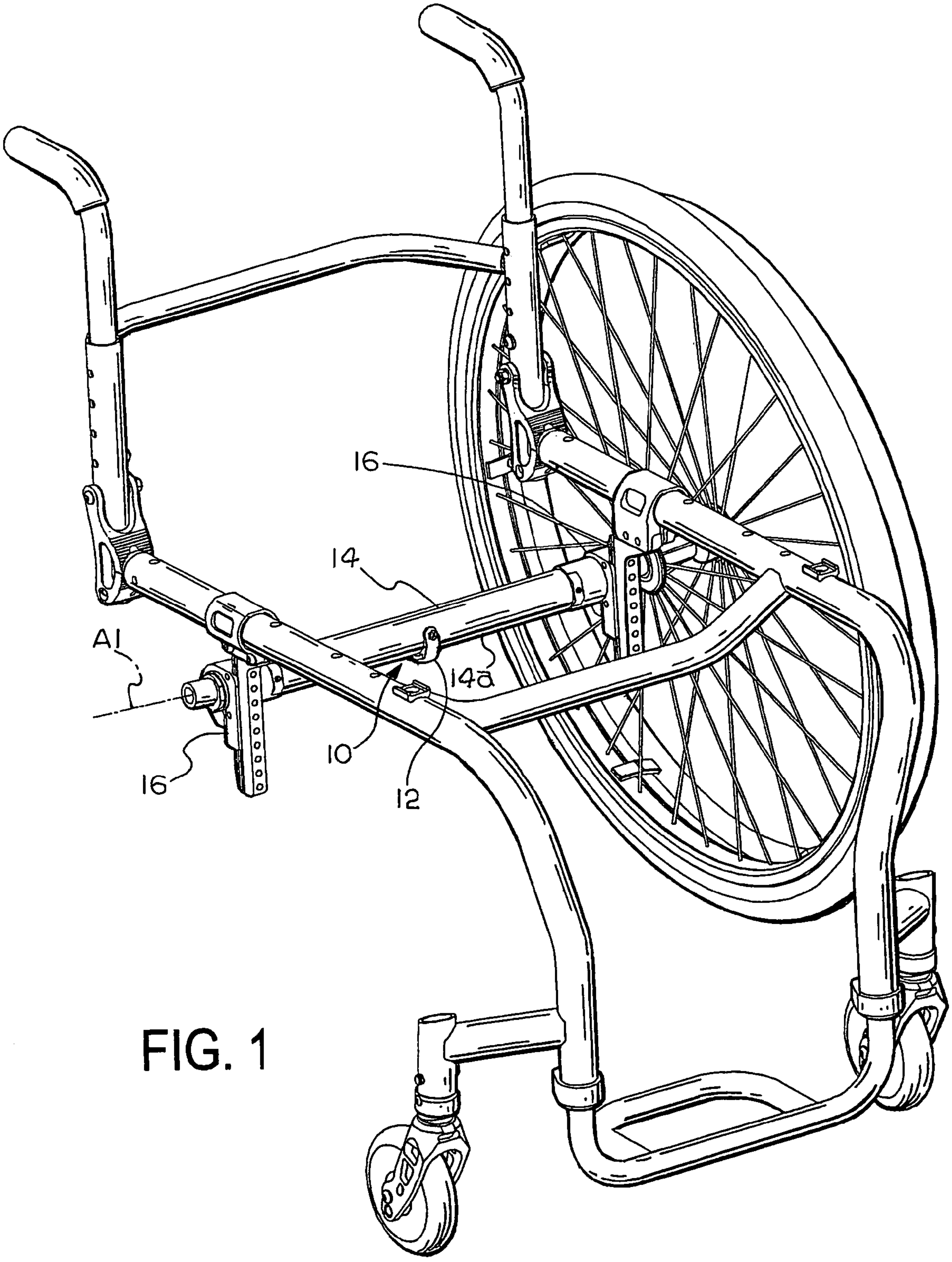
FIG. 1 is a front perspective view of a portion of a wheelchair having a camber tube, and a camber tube level according to the invention.
Figure 2B:
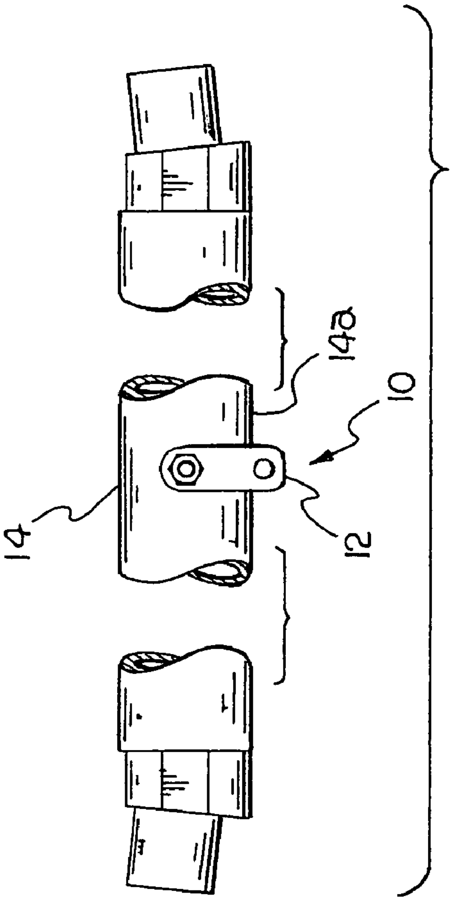
FIG. 2B is a front elevational view of the camber tube and the camber tube level shown in FIG. 2A.
Figure 2A:
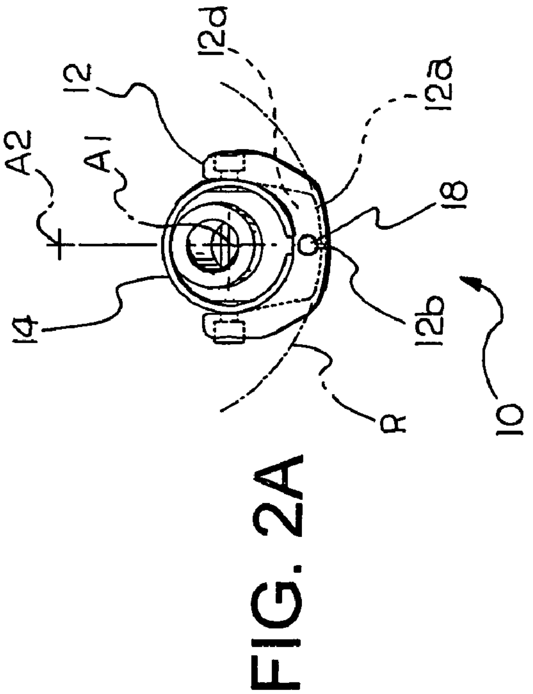
FIG. 2A is a side elevational view of the camber tube and the camber tube level shown in FIG. 1.

Referring now to the drawings, there is illustrated in FIGS. 1, 2A and 2B a camber tube level indicator or level 10 comprising a housing 12 that is adapted to be mounted to a rear wheel axle or camber tube 14 of a wheelchair. The housing 12 is preferably a clear plastic housing, which is adapted to be mounted to an underside 14*a* of the camber tube 14. The camber tube 14 can be mounted to the wheelchair in any suitable manner; such as by using one or more clamps, such as the clamps 16 shown. The clamps 16 shown, when loosened, permit the camber tube 14 to be rotated about the axis A1 of the camber tube 14. The housing 12 of the illustrated embodiment has an internal curved or curved shaped track 12*a*, as shown in FIG. 2A. A material or object, such as cylindrical or spherical ball 18 or other rolling device, is adapted to rest upon the track 12*a*, and may freely roll or travel to the lowest position on the track 12*a* due to gravity. The track 12*a* is of preferably a substantially constant radius R, with the axis A2 of the radius R being parallel with the axis A1 of the camber tube 14. The housing 12 preferably has a center mark 12*b* that is adapted to align with the location of the ball 18 along the track 12*a* when the camber tube 14 is oriented horizontally. To make toe-in and toe-out adjustments, a user could rotate the camber tube 14 within the clamps 16 until the ball 18 rolls or travels and settles in a position coincident with the center mark 12*b*. The curved track 12*a* preferably has a radius R that is sufficiently large to provide the level 10 with accuracy when making this adjustment.

The housing 12 is preferably designed so that the housing 12 can be easily installed on a camber tube 14. The track 12*a* is preferably opened at a top of the track 12*a* so that the ball 18 may be captured between the housing 12 and the camber tube 14 when installed. The track 12*a* and the camber tube 14 preferably cooperate to form a closed cavity 12*d*, where the ball 18 may reside inside the track 12*a* and not be easily contaminated by dust, fluids, or other contaminants. The housing 12 may be mounted to the camber tube 14 using screws, bolts, pop rivets, adhesives, or other suitable fasteners or means.

The camber tube level 10 facilitates toe-in and toe-out adjustment by providing an easily viewable reference to indicate when the camber tube 14 has been rotated to a level position. No additional tools are required, and the level 10 may be easily viewed from the side or from below the wheelchair. This is particularly advantageous, considering that a wheelchair is most frequently set on a level workbench or table when adjustments are made. The camber tube level 10 can be provided with the wheelchair, pre-installed on the camber tube 14, or it can be sold as an after market add-on feature that can be sized for standard camber tube diameters.

Figure 3B:
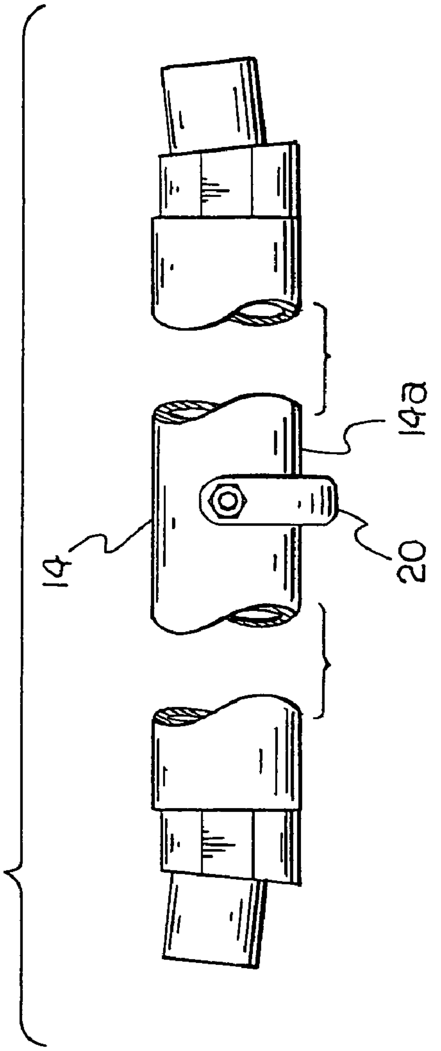
FIG. 3B is a front elevational view of the camber tube and the camber tube level shown in FIG. 3A.
Figure 3A:
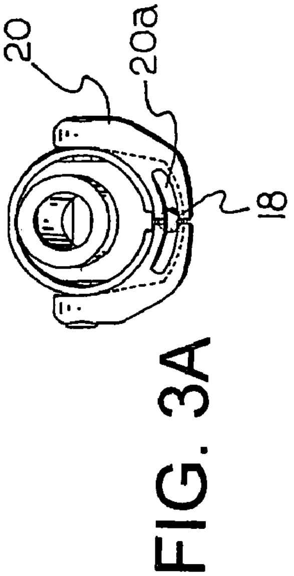
FIG. 3A is a side elevational view of a camber tube and a camber tube level according to another embodiment of the invention.

Another embodiment of the invention is shown in FIGS. 3A and 3B, wherein a housing 20 is provided with a slot 20*a*. The housing 20 may be made from an opaque plastic. The slot 20*a* may serve as a window through which to view the ball 18.

Figure 4B:
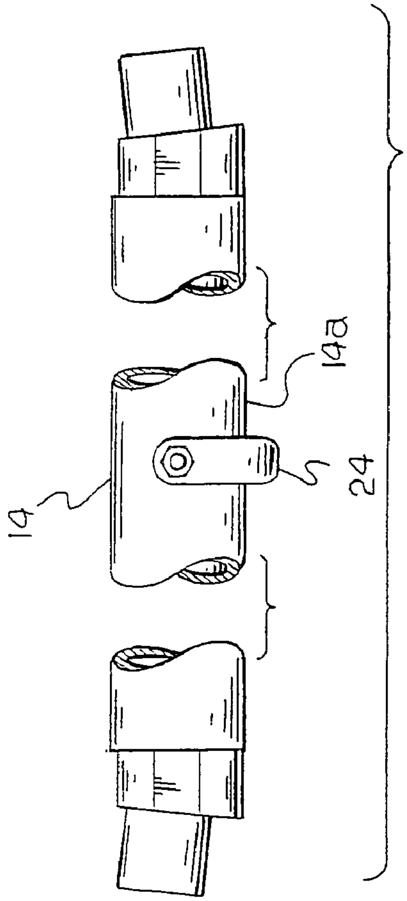
FIG. 4B is a front elevational view of the camber tube and the camber tube level shown in FIG. 4A.
Figure 4A:
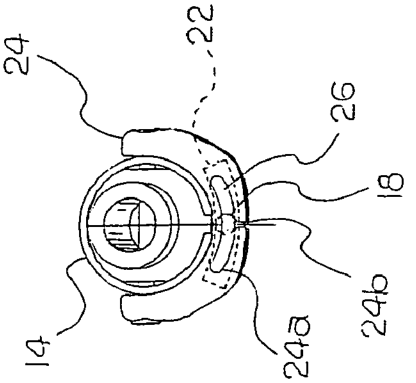
FIG. 4A is a side elevational view of a camber tube and a camber tube level according to still another embodiment of the invention.

Still another embodiment of the invention is shown in FIGS. 4A and 4B, wherein a curved glass vial 22 may be installed into a housing 24. The housing 24 is preferably a plastic housing having a viewing window 24*a*. The vial 22 may have a material, such as a ball 18 and/or a liquid 26 therein. The liquid 26 may serve to dampen the motion of the ball 18 and allow the ball 18 to settle more quickly to the lowest position within the vial 22. An indicator mark 24*b* may be provided on the housing 24 to show when the camber tube 14 is oriented horizontally or substantially horizontally.

Figure 5B:
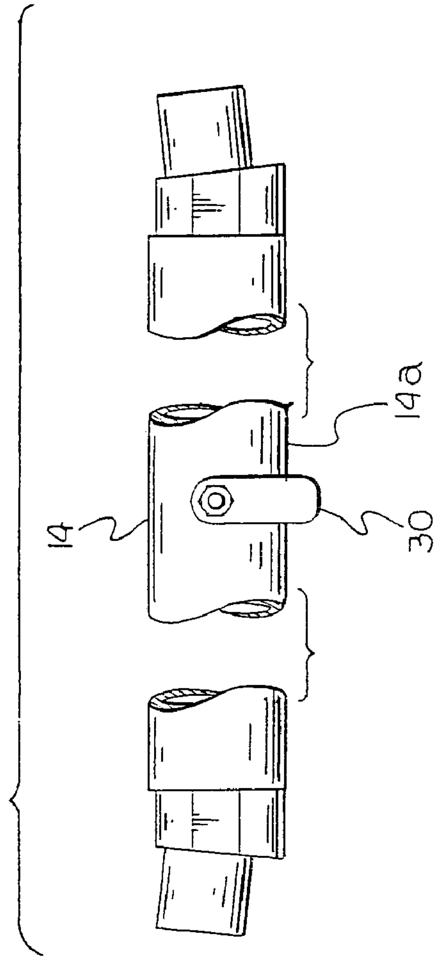
FIG. 5B is a front elevational view of the camber tube and the camber tube level shown in FIG. 5A.
Figure 5A:
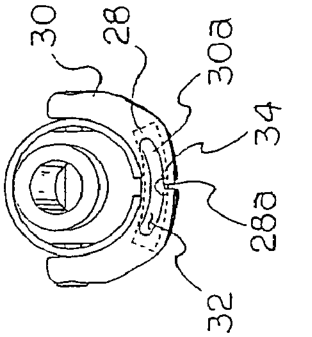
FIG. 5A is a side elevational view of a camber tube and a camber tube level according to yet another embodiment of the invention.

Yet another embodiment of the invention is shown in FIGS. 5A and 5B, wherein a vial 28, which is preferably a curved glass vial, is installed into a housing 30, which is preferably a plastic housing with a viewing window 30*a*. The vial 28 preferably contains a material, such as two liquids 32, 34 that have different densities and thus do not intermix. The less dense liquid 32 is preferably clear. The more dense liquid 34 is preferably opaque. The more dense liquid 34 is adapted to settle to a lowest point along the curved glass vial 28. An indicator mark 28*a* is preferably on the vial 28 to show when the camber tube 14 is oriented horizontally or substantially horizontally.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A level indicator mounted to an underside of a wheelchair camber tube or rear wheel axle comprising a track and a ball, wherein the ball is adapted to travel along the track and settle to a given low point on the track due to gravity.

2. The level indicator according to claim 1, wherein the track has a curved shape.

3. The level indicator according to claim 1, wherein the track has a U-shape with a bottom serving as the low point of the track.

4. A level indicator mounted to an underside of a wheelchair camber tube or rear wheel axle comprising a track and a displaceable element that is adapted to travel along the track and settle to a given low point on the track due to gravity.

5. The level indicator according to claim 4, wherein the track has a curved shape.

6. The level indicator according to claim 5, wherein the track is contained within a housing that has an area that is provided to view a position of the displaceable element within the housing.

7. The level indicator according to claim 6, wherein the housing has a center mark that is aligned with the displaceable element when the camber tube is aligned correctly to eliminate toe-in or toe-out.

8. The level indicator according to claim 5, wherein a housing has a center mark that is aligned with the displaceable element when the camber tube is aligned correctly to eliminate toe-in or toe-out.

9. The level indicator according to claim 5, wherein the track is contained within a clear or translucent housing that permits viewing of a position of the displaceable element within the housing.

10. The level indicator according to claim 9, wherein the housing has a center mark that is aligned with the displaceable element when the camber tube is aligned correctly to eliminate toe-in or toe-out.

11. A level indicator mounted to an underside of a wheelchair camber tube or rear wheel axle comprising a clear vial containing a material that resides inside the vial, wherein the material is adapted to travel inside the vial and settle to a given low point on the vial due to gravity.

12. The level indicator according to claim 11, further comprising a center mark that is aligned with the material when the camber tube is aligned correctly to eliminate toe-in/toe-out.

13. The level indicator according to claim 11, wherein the vial is filled with liquid that is provided to dampen the travel of the material, so as to allow the material to settle quickly to the given low point.

14. The level indicator according to claim 13, further comprising a center mark that is aligned with the material when the camber tube is aligned correctly to eliminate toe-in/toe-out.

15. The level indicator according to claim 11, wherein the material is a ball.

16. The level indicator according to claim 15, further comprising a center mark that is aligned with the ball when the camber tube is aligned correctly to eliminate toe-in/toe-out.

17. The level indicator according to claim 11, wherein the material is a liquid.

18. The level indicator according to claim 17, further comprising a center mark that is aligned with the liquid when the camber tube is aligned correctly to eliminate toe-in/toe-out.

19. A level indicator mounted to an underside of a wheelchair camber tube or rear wheel axle comprising a clear vial containing two liquids of differing density that do not intermix, one liquid being clear in appearance and the other liquid being opaque in appearance, wherein the denser liquid settles to a given low point along the vial due to gravity.

20. The level indicator according to claim 19, further comprising a center mark that is aligned with the denser liquid when the camber tube is aligned correctly to eliminate toe-in/toe-out.

* * * * *